US007344000B2

(12) United States Patent
Dammeyer et al.

(10) Patent No.: US 7,344,000 B2
(45) Date of Patent: Mar. 18, 2008

(54) ELECTRONICALLY CONTROLLED VALVE FOR A MATERIALS HANDLING VEHICLE

(75) Inventors: Karl L. Dammeyer, St. Marys, OH (US); William C. Jones, Jr., Greenville, OH (US)

(73) Assignee: Crown Equipment Corporation, New Bremen, OH (US)

( * ) Notice: Subject to any disclaimer, the term of this patent is extended or adjusted under 35 U.S.C. 154(b) by 401 days.

(21) Appl. No.: 10/948,723

(22) Filed: Sep. 23, 2004

(65) Prior Publication Data

US 2006/0060409 A1 Mar. 23, 2006

(51) Int. Cl.
*B60K 17/00* (2006.01)

(52) U.S. Cl. ...................................... 180/305; 187/223

(58) Field of Classification Search ................ 187/222, 187/223, 224; 180/305, 306

See application file for complete search history.

(56) References Cited

U.S. PATENT DOCUMENTS 3,263,574 A 8/1966 Tennis
3,709,331 A * 1/1973 Smith, Jr. .................. 187/222
3,843,003 A 10/1974 Frank
3,947,744 A * 3/1976 Grace et al. ................ 320/128
4,130,183 A 12/1978 Tjörnemark
4,144,946 A 3/1979 Melocik
4,204,460 A 5/1980 Andersen et al.
4,354,568 A 10/1982 Griesenbrock
4,426,683 A 1/1984 Kissell
4,467,894 A 8/1984 Sinclair
4,485,623 A 12/1984 Chichester et al.
4,499,541 A 2/1985 Yuki et al.
4,509,127 A 4/1985 Yuki et al.
4,511,974 A 4/1985 Nakane et al.
4,517,645 A 5/1985 Yuki et al.
4,548,296 A 10/1985 Hasegawa
4,552,250 A 11/1985 Luebrecht
4,592,449 A 6/1986 Sakata et al.
4,665,698 A 5/1987 Trusock
4,716,990 A 1/1988 Takeuchi
4,742,468 A 5/1988 Ohashi et al.
4,817,760 A 4/1989 Yamamura
4,826,474 A 5/1989 Holmes
4,869,635 A 9/1989 Krahn
4,942,529 A 7/1990 Avitan et al.
4,943,756 A 7/1990 Conley, III et al.
5,011,363 A 4/1991 Conley, III et al.
5,022,496 A 6/1991 Klopfleisch et al.

(Continued)

FOREIGN PATENT DOCUMENTS

DE 3414793 10/1984

(Continued)

*Primary Examiner*—Christopher P. Ellis
*Assistant Examiner*—Brian L Swenson
(74) *Attorney, Agent, or Firm*—Stevens & Showalter LLP

(57) ABSTRACT

A materials handling vehicle is provided comprising: a base; a carriage assembly movable relative to the base; at least one cylinder coupled to the base to effect movement of the carriage assembly relative to the base; and a hydraulic system to supply a pressurized fluid to the cylinder. The hydraulic system includes an electronically controlled valve coupled to the cylinder. The vehicle further comprises control structure to control the operation of the valve such that the valve is closed in the event of an unintended descent of a carriage assembly in excess of a commanded speed.

21 Claims, 12 Drawing Sheets

U.S. PATENT DOCUMENTS

| | | | | |
|---|---|---|---|---|
| 5,044,472 | A | | 9/1991 | Dammeyer et al. |
| 5,238,086 | A | | 8/1993 | Aoki et al. |
| 5,266,115 | A | | 11/1993 | Taccon et al. |
| 5,329,441 | A | * | 7/1994 | Aoki et al. .................. 701/50 |
| 5,341,695 | A | | 8/1994 | Avitan |
| 5,462,136 | A | | 10/1995 | Schoemaker et al. |
| 5,526,673 | A | | 6/1996 | Avitan |
| 5,647,457 | A | | 7/1997 | Wegdam et al. |
| 5,649,422 | A | | 7/1997 | Baginski et al. |
| 5,652,486 | A | | 7/1997 | Mueller et al. |
| 5,657,834 | A | | 8/1997 | Plaugher et al. |
| 5,666,295 | A | | 9/1997 | Bruns |
| 5,680,762 | A | | 10/1997 | Reid |
| 5,687,081 | A | | 11/1997 | Wellman et al. |
| 5,712,618 | A | | 1/1998 | McKenna |
| 5,717,588 | A | | 2/1998 | Yamane et al. |
| 5,733,095 | A | | 3/1998 | Palmer et al. |
| 5,816,366 | A | * | 10/1998 | Briday et al. ............... 187/224 |
| 5,890,563 | A | | 4/1999 | Avitan et al. |
| 5,969,302 | A | | 10/1999 | Nishizawa et al. |
| 6,009,357 | A | | 12/1999 | Wellman et al. |
| 6,125,970 | A | * | 10/2000 | Takeuchi et al. ............ 187/223 |
| 6,135,694 | A | | 10/2000 | Trego et al. |
| 6,269,913 | B1 | | 8/2001 | Kollmannsberger |
| 6,439,102 | B1 | | 8/2002 | Matsuzaki et al. |
| 6,533,076 | B1 | | 3/2003 | Haverfield et al. |
| 6,557,586 | B1 | | 5/2003 | Lockyer et al. |
| 6,611,746 | B1 | | 8/2003 | Nagai |
| 6,785,597 | B1 | * | 8/2004 | Farber et al. ................. 701/50 |
| 2003/0159576 | A1 | | 8/2003 | Schoonmaker et al. |
| 2003/0167114 | A1 | | 9/2003 | Chen |
| 2004/0079076 | A1 | | 4/2004 | Lazaro |

FOREIGN PATENT DOCUMENTS

| | | | |
|---|---|---|---|
| DE | 4017947 | | 12/1991 |
| DE | 19933559 | | 1/2001 |
| DE | 100 10 670 | A1 | 9/2001 |
| DE | 10030059 | | 12/2001 |
| DE | 10110700 | | 9/2002 |
| EP | 0 439 436 | A2 | 7/1991 |
| EP | 0439436 | A2 | 7/1991 |
| GB | 2 196 447 | A | 4/1988 |
| JP | 1168550 | | 7/1989 |
| JP | 03-098997 | | 4/1991 |
| JP | 5131299 | | 5/1993 |
| JP | 72337856 | | 9/1995 |
| JP | 8156674 | | 6/1996 |

* cited by examiner

ELECTRONICALLY CONTROLLED VALVE FOR A MATERIALS HANDLING VEHICLE

TECHNICAL FIELD

The present invention relates to an electronically controlled valve coupled to a lift cylinder which, in turn, is coupled to a carriage assembly, wherein the valve is controlled so as to close in the event of an unintended descent of the carriage assembly.

BACKGROUND OF THE INVENTION

A materials handling vehicle is known in the prior art comprising a base unit including a power source and a mast assembly. A fork carriage assembly is coupled to the mast assembly for vertical movement relative to the power source with at least one cylinder effecting vertical movement of the carriage assembly. A hydraulic system is coupled to the cylinder for supplying a pressurized fluid to the cylinder, and includes an ON/OFF blocking valve positioned in a manifold for preventing the carriage assembly from drifting downwardly when raised via the cylinder to a desired vertical position relative to the power source. A metering valve, also positioned in the manifold, defines the rate at which pressurized fluid is metered to the cylinder to raise the carriage assembly and metered from the cylinder to lower the carriage assembly. A velocity fuse, i.e., a mechanical valve, is positioned in a base of the cylinder to prevent an unintended descent of the carriage assembly in excess of approximately 120 feet/minute. The velocity fuse has a fixed setpoint such that it is closed and stops fluid flow at the cylinder when the carriage assembly downward speed exceeds about 120 feet/minute. Hence, such fuses will not permit controlled downward movement of a carriage assembly at a speed in excess of about 120 feet/minute. However, it would be desirable to allow an intended descent of a carriage assembly in a controlled manner at a speed in excess of 120 feet/minute to improve productivity.

It is noted that when a velocity fuse closes, it closes very quickly resulting in a hydraulic fluid pressure spike occurring within the cylinder. Such a pressure spike can cause the cylinder to bow, buckle or otherwise deform. It would be desirable to reduce such pressure spikes. It would also be desirable to eliminate the velocity fuse so as to remove cost from the vehicle.

It is also known in the prior art to use flow control valves in place of velocity fuses. Those valves are designed to limit the flow of hydraulic fluid from a lift support cylinder such that a carriage assembly is prevented from moving downwardly at a speed in excess of about 120 feet/minute. Because such valves are mechanical, they too will not permit controlled downward movement of a carriage assembly at a speed in excess of about 120 feet/minute.

SUMMARY OF THE INVENTION

These deficiencies are addressed by the present invention, wherein an electronically controlled valve is provided which effects functions previously performed by the prior art velocity fuse/flow control valve and ON/OFF blocking valve.

In accordance with a first aspect of the present invention, a materials handling vehicle is provided comprising: a base; a carriage assembly movable relative to the base; at least one cylinder coupled to the base to effect movement of the carriage assembly relative to the base; and a hydraulic system to supply a pressurized fluid to the cylinder. The hydraulic system includes an electronically controlled valve coupled to the cylinder. Further provided is a control structure for controlling the operation of the valve.

The control structure is preferably capable of energizing the valve so as to open the valve to permit the carriage assembly to be lowered in a controlled manner to a desired position relative to the base. The control structure de-energizes the valve in response to an operator-generated command to cease further descent of the carriage assembly relative to the base. The control structure further functions to close the valve in the event of an unintended descent of the carriage assembly in excess of a commanded speed. This serves to allow an intended, controlled descent of the carriage assembly at a desired speed, including speeds greater than 120 feet/minute, while preventing an unintended descent of the carriage assembly at a speed greater than a commanded speed. The valve preferably functions as a check valve when de-energized so as to block pressurized fluid from flowing out of the cylinder, and allows pressurized fluid to flow into the cylinder during a carriage assembly lift operation.

Preferably, the valve is positioned in a base of the cylinder. In accordance with a first embodiment of the present invention, the valve comprises a solenoid-operated, normally closed valve. This valve closes substantially immediately upon being de-energized. In accordance with a second embodiment of the present invention, the valve comprises a solenoid-operated, normally closed, proportional valve.

The control structure may comprise: an encoder unit associated with the carriage assembly for generating encoder pulses as the carriage assembly moves relative to the base; and a controller coupled to a commanded speed input device, the encoder unit and the valve for receiving the encoder pulses generated by the encoder unit and determining the rate of descent of the carriage assembly based on the received encoder pulses. The controller functions to de-energize the valve causing it to move from its powered open state to its closed state in the event the carriage assembly moves downwardly at a speed in excess of the commanded speed. Alternatively, in place of an encoder, a differential pressure sensor may be provided in the cylinder to sense a fluid pressure difference across an orifice associated with the cylinder. The orifice may be within the valve coupled to the cylinder. An increase in fluid pressure difference across the orifice occurs when an increase in fluid flow out of the cylinder is taking place, which corresponds to an increase in downward speed of the carriage assembly. Hence, the differential pressure sensor generates signals to the controller indicative of the downward speed of the carriage assembly. If an unexpected increase in fluid pressure difference across the orifice occurs due to an unexpected increase in fluid flow out of the cylinder, which unexpected pressure change is indicative of an unintended rate of descent of the carriage assembly, the controller functions to de-energize the valve causing it to move from its powered open state to its closed state.

In the embodiment where the valve comprises a solenoid-operated, normally closed, proportional valve, the controller preferably slowly closes the valve in the event the carriage assembly moves downwardly at a speed in excess of the commanded speed as sensed by the encoder, or an unexpected increase in fluid pressure difference occurs across an orifice, as sensed by the differential pressure sensor. For example, the controller may cause the valve to move from its powered open position to its closed position over a time period of from about 0.3 second to about 1.0 second. Alternatively, the controller may cause the valve to move from its powered open position to its closed position over a time period of from about 0.5 second to about 0.7 second.

The base may comprise a power unit and the carriage assembly may comprise a platform assembly which moves relative to the power unit along a mast assembly. Alternatively, the base may comprise a load handler assembly and the carriage assembly may comprise a fork carriage assembly which moves relative to the load handler assembly.

In accordance with an alternative embodiment of the present invention, the control structure controls the operation of the valve such that the valve is closed in the event the following two conditions are met: 1) unintended descent of the carriage assembly in excess of the commanded speed, and 2) unintended descent of the carriage assembly in excess of a predefined threshold speed, such as 120 feet/minute. The control structure is preferably capable of energizing the valve so as to open the valve to permit the carriage assembly to be lowered in a controlled manner to a desired position relative to the base at a speed in excess of the predefined threshold speed.

In accordance with a second aspect of the present invention, a materials handling vehicle is provided comprising: a base; a carriage assembly movable relative to the base; at least one cylinder coupled to the base to effect movement of the carriage assembly relative to the base; and a hydraulic system to supply a pressurized fluid to the cylinder. The hydraulic system includes an electronically controlled valve coupled to the cylinder. Further provided is control structure to control the operation of the valve such that the valve is closed in the event of a loss of pressure in the fluid being supplied by the hydraulic system to the valve.

The control structure may be capable of energizing the valve so as to open the valve to permit the carriage assembly to be lowered in a controlled manner to a desired position relative to the base. Preferably, the control structure de-energizes the valve when the carriage assembly is not being lowered in a controlled manner relative to the base.

The valve may function as a check valve when de-energized so as to block pressurized fluid from flowing out of the cylinder, and allowing pressurized fluid to flow into the cylinder during a carriage assembly lift operation.

The control structure may comprise: an encoder unit associated with the carriage assembly for generating encoder pulses as the carriage assembly moves relative to the base; and a controller coupled to the encoder unit and the valve for receiving the encoder pulses generated by the encoder unit and monitoring the rate of descent of the carriage assembly based on the received encoder pulses. The controller functions to de-energize the valve causing it to move from its powered open state to its closed state in the event the carriage assembly moves downwardly in an unintended manner at a speed in excess of a commanded speed. Alternatively, the controller functions to de-energize the valve causing it to move from its powered open state to its closed state in the event the carriage assembly moves downwardly in an unintended manner at a speed in excess of a commanded speed and a predefined speed.

In the event the rate of descent of the carriage assembly exceeds a commanded speed or an unexpected fluid pressure drop occurs in the cylinder, the controller may slowly close the valve over a period of time greater than or equal to 0.1 second.

DETAILED DESCRIPTION OF THE INVENTION

Figure 1:
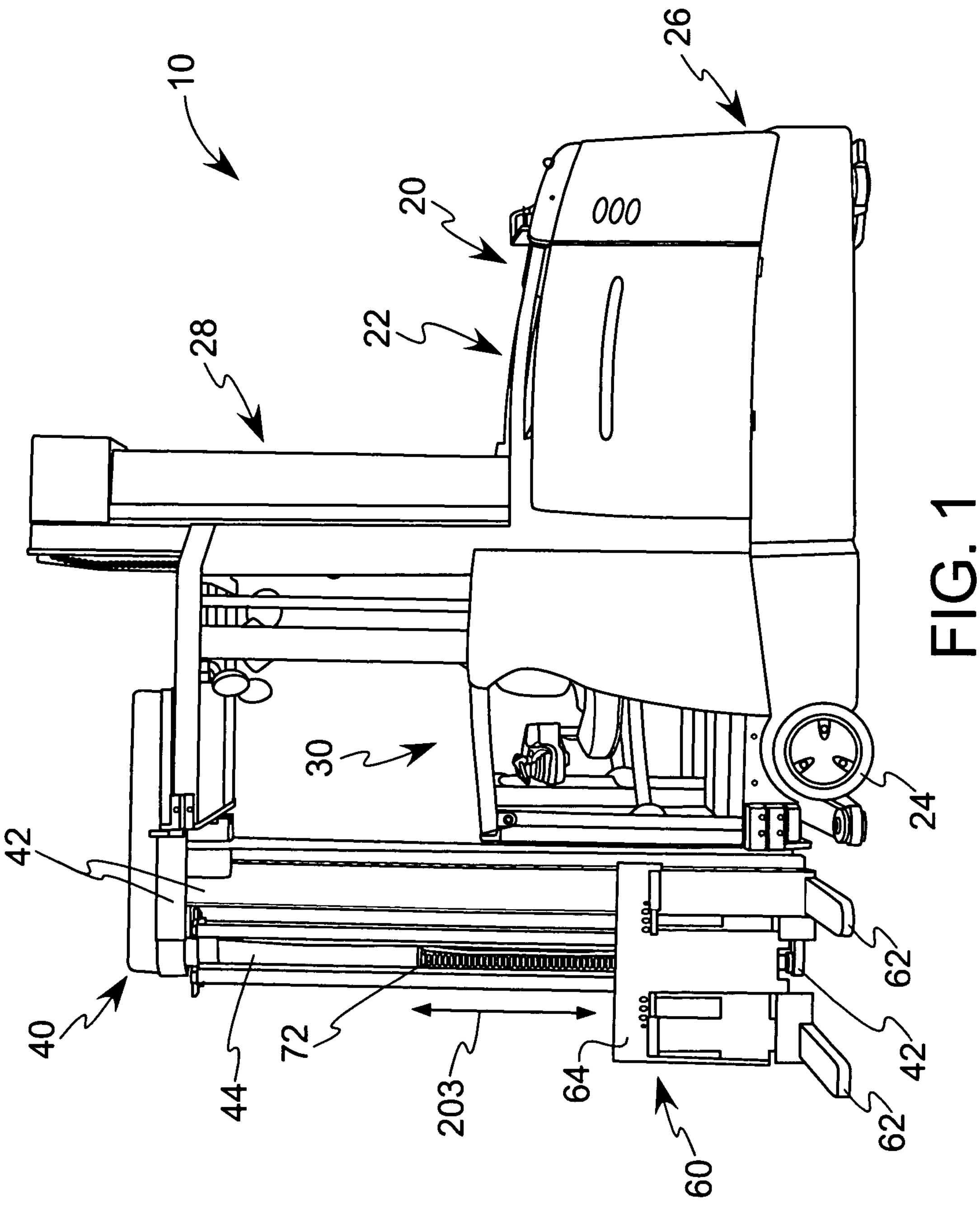
FIG. 1 is a side view of a materials handling vehicle constructed in accordance with the present invention.

Referring now to the drawings, and particularly to FIGS. 1-4 and 6, which illustrate a materials handling vehicle 10 constructed in accordance with the present invention. In the illustrated embodiment, the vehicle 10 comprises a turret stockpicker. The vehicle 10 includes a power unit 20, a platform assembly 30 and a load handling assembly 40. The power unit 20 includes a power source, such as a battery unit 22, a pair of load wheels 24, see FIG. 6, positioned under the platform assembly 30, a steered wheel 25, see FIG. 4, positioned under the rear 26 of the power unit 20, and a mast assembly 28 on which the platform assembly 30 moves vertically. The mast assembly 28 comprises a first mast **28*a* fixedly coupled to the power unit 20, and a second mast 28*b* movably coupled to the first mast 28*a*, see FIGS. 4 and 6**.

Figure 4:
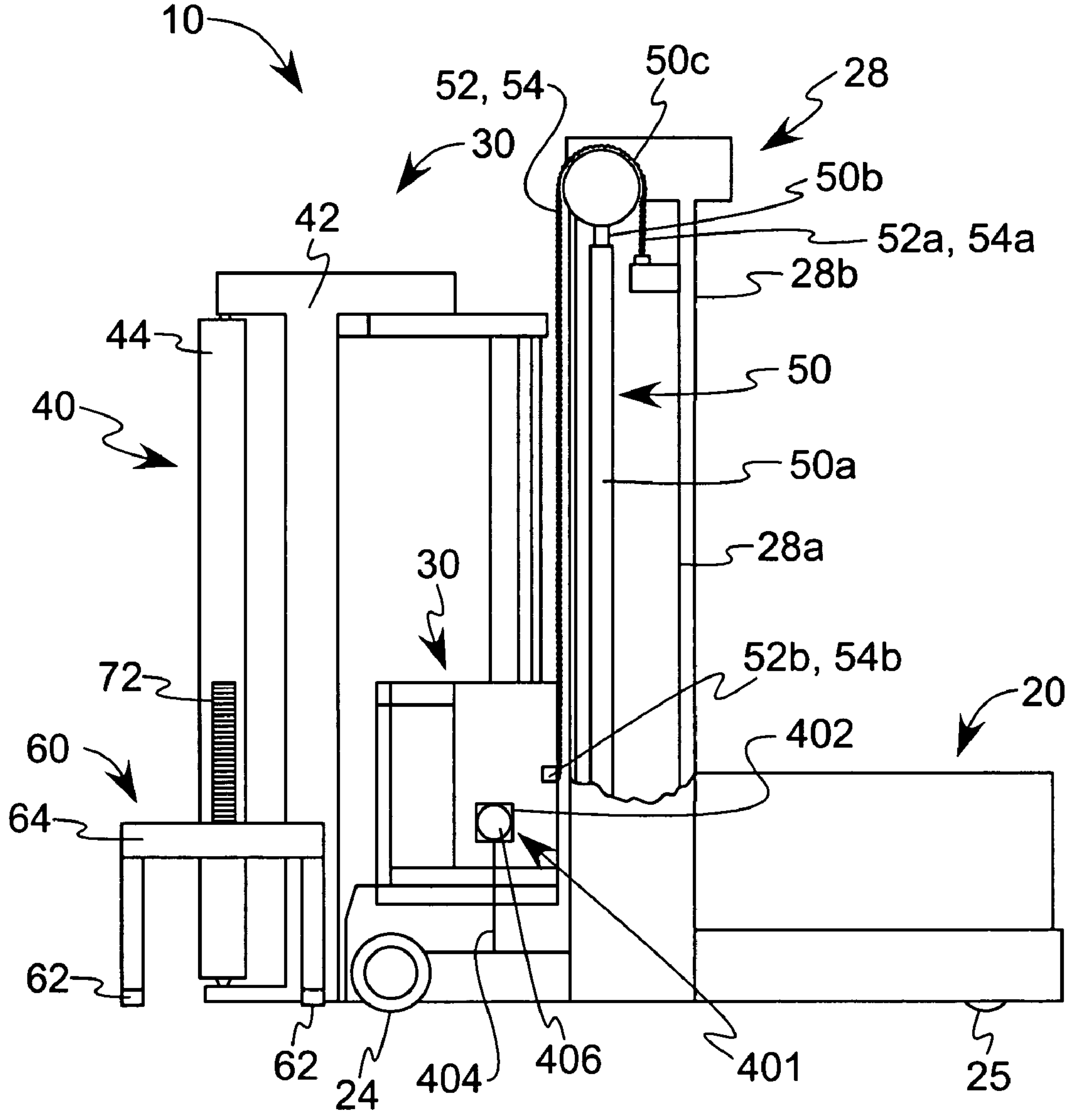
FIG. 4 is a schematic view of the vehicle of FIG. 1 illustrating the platform lift cylinder.

A mast piston/cylinder unit 50 is provided in the first mast **28*a* for effecting movement of the second mast 28*b* and the platform assembly 30 relative to the first mast 28*a* and the power unit 20, see FIG. 4. It is noted that the load handling assembly 40 is mounted to the platform assembly 30; hence, the load handling assembly 40 moves with the platform assembly 30. The cylinder 50*a* forming part of the piston/cylinder unit 50 is fixedly coupled to the power unit 20. The piston or ram 50*b* forming part of the unit 50 is fixedly coupled to the second mast 28*b* such that movement of the piston 50*b* effects movement of the second mast 28*b* relative to the first mast 28*a*. The piston 50*b* comprises a roller 50*c* on its distal end which engages a pair of chains 52 and 54. One unit of vertical movement of the piston 50*b* results in two units of vertical movement of the platform assembly 30. Each chain 52, 54 is fixedly coupled at a first end 52*a*, 54*a* to the first mast 28*a* and coupled at a second end 52*b*, 54*b*** to the platform assembly 30. Hence, upward movement of the piston 50*b* relative to the cylinder 50*a* effects upward movement of the platform assembly 30 via the roller 50*c* pushing upwardly against the chains 52, 54. Downward movement of the piston 50*b* effects downward movement of the platform assembly 30. Movement of the piston 50*b* also effects movement of the second mast 28*b*.

Figure 2:
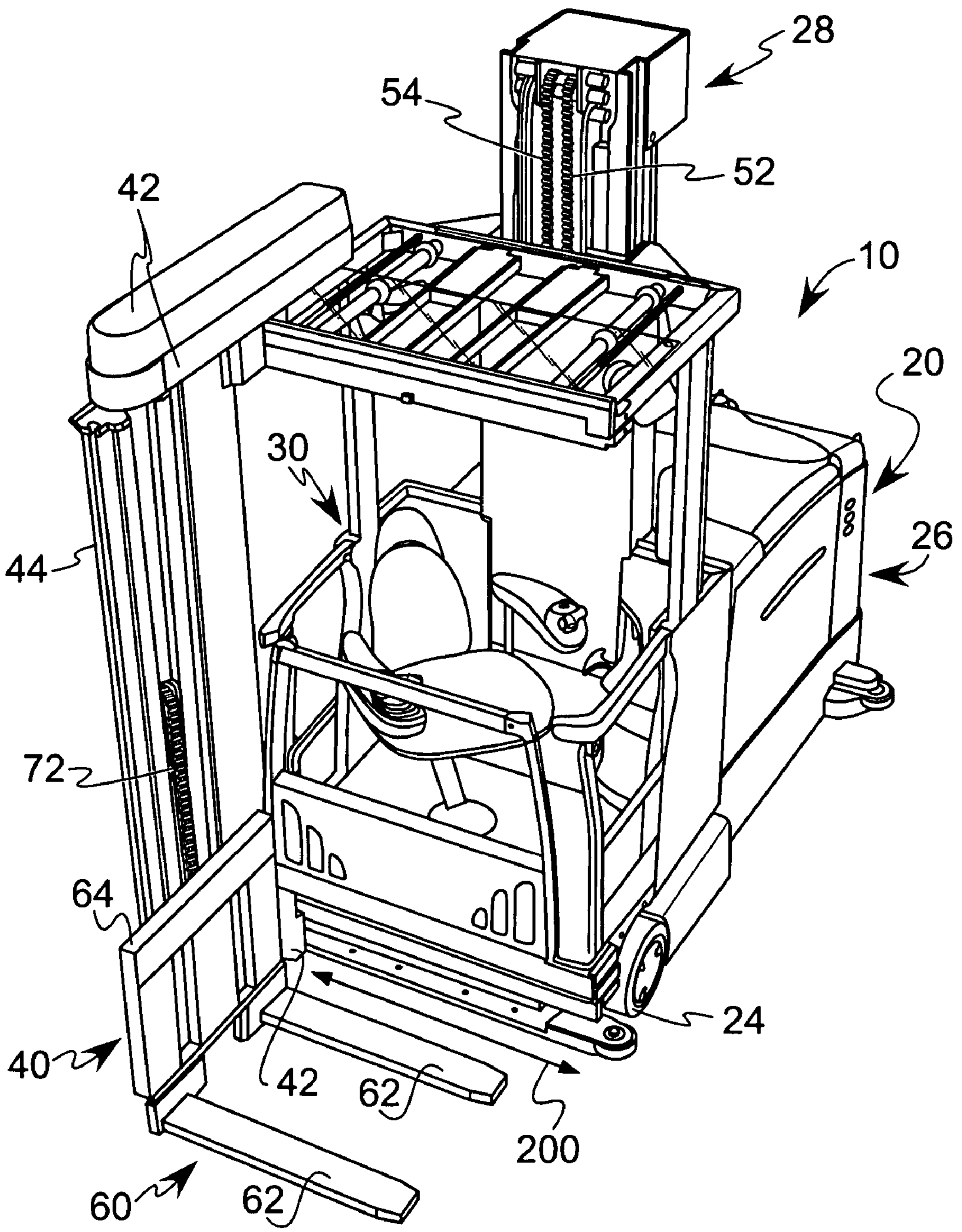
FIG. 2 is a perspective view of the vehicle illustrated in FIG. 1.
Figure 3:
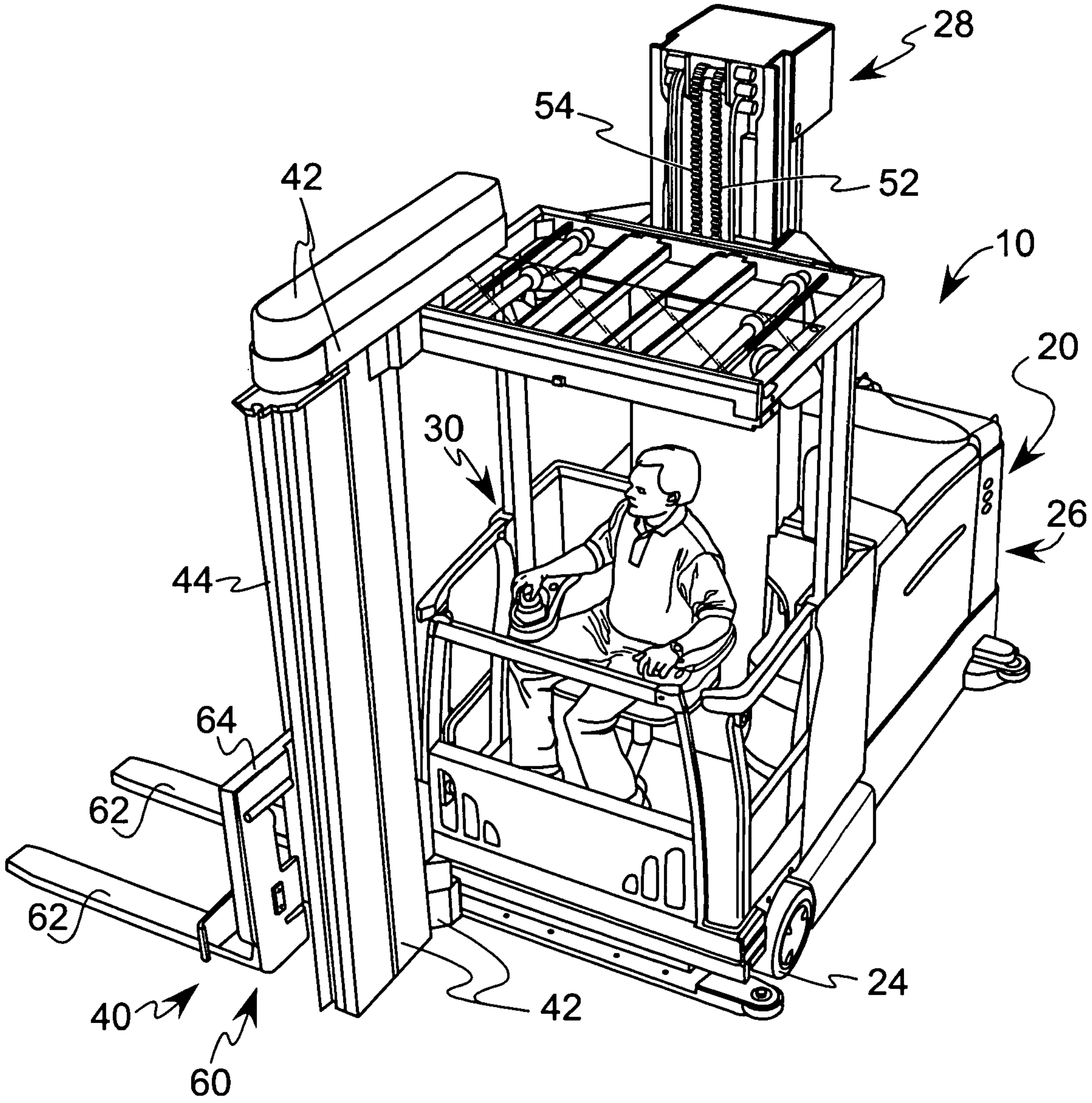
FIG. 3 is a perspective view of the vehicle illustrated in FIG. 1 and with the fork assembly rotated 180° from the position of the fork assembly shown in FIG. 2.

The load handling assembly 40 comprises a first structure 42 which is movable back and forth transversely relative to the platform assembly 30, as designated by an arrow 200 in FIG. 2, see also FIGS. 3 and 4. The load handling assembly 40 further comprises a second structure 44 (also referred to as an auxiliary mast) which moves transversely with the first structure 42 and is also capable of rotating relative to the first structure 42; in the illustrated embodiment, back and forth through an angle of about 180°. Coupled to the second structure 44 is a fork carriage assembly 60 comprising a pair of forks 62 and a fork support 64. The fork carriage assembly 60 is capable of moving vertically relative to the second structure 44, as designated by an arrow 203 in FIG. 1. Rotation of the second structure 44 relative to the first structure 42 permits an operator to position the forks 62 in one of at least a first position, illustrated in FIGS. 1, 2 and 4, and a second position, illustrated in FIG. 3, where the second structure 44 has been rotated through an angle of about 180 ° from its position shown in FIGS. 1, 2 and 4.

Figure 5:
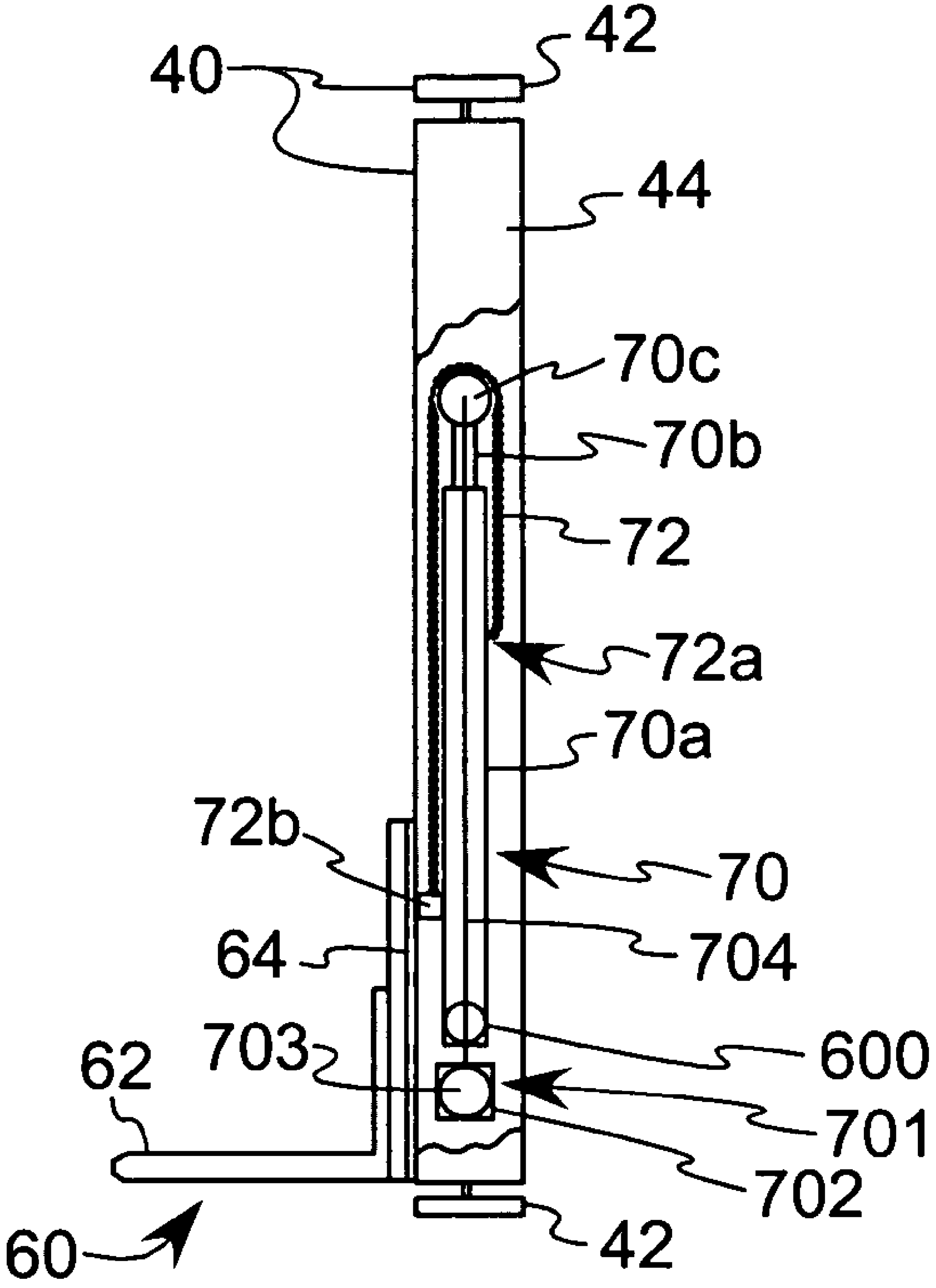
FIG. 5 is a schematic view illustrating the fork carriage assembly lift cylinder and electronically controlled valve coupled to the fork carriage assembly lift cylinder of the vehicle illustrated in FIG. 1.
Figure 6:
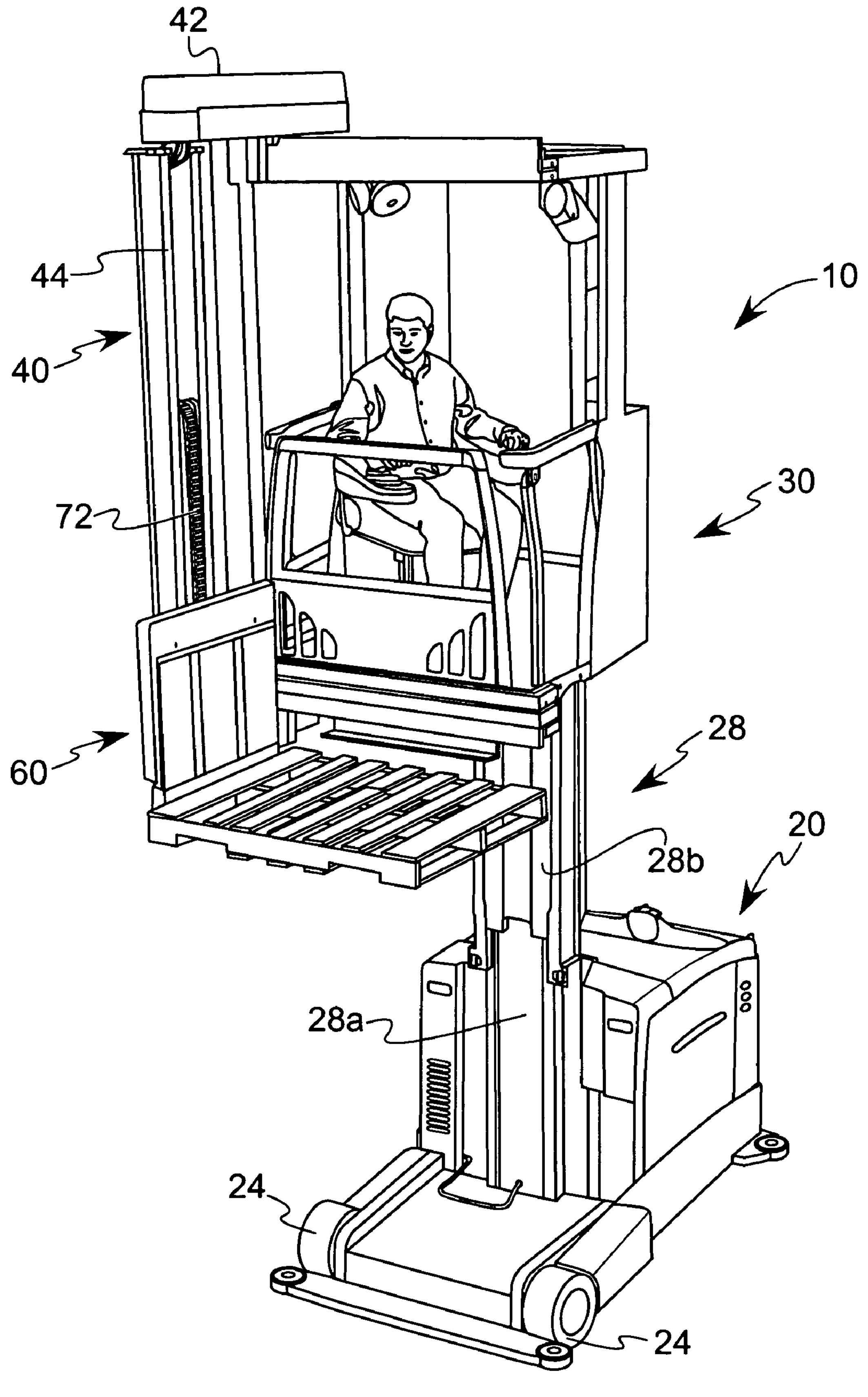
FIG. 6 is a perspective view of the vehicle illustrated in FIG. 1 with the platform assembly illustrated in an elevated position.

A piston/cylinder unit 70 is provided in the second structure 44 for effecting vertical movement of the fork carriage assembly 60 relative to the second structure 44, see FIG. 5. The cylinder 70*a* forming part of the piston/cylinder unit 70 is fixedly coupled to the second structure 44. The piston or ram 70*b* forming part of the unit 70 comprises a roller 70*c* on its distal end which engages a chain 72. One unit of vertical movement of the piston 70*b* results in two units of vertical movement of the fork carriage assembly 60. The chain 72 is fixedly coupled at a first end 72*a* to the cylinder 70*a* and fixedly coupled at a second end 72*b* to the fork support 64. The chain 72 extends from the cylinder 70*a*, over the roller 70*c* and down to the fork support 64. Upward movement of the piston 70*b* effects upward movement of the fork carriage assembly 60 relative to the second structure 44, while downward movement of the piston 70*b* effects downward movement of the fork carriage assembly 60 relative to the second structure 44.

Figure 7A:
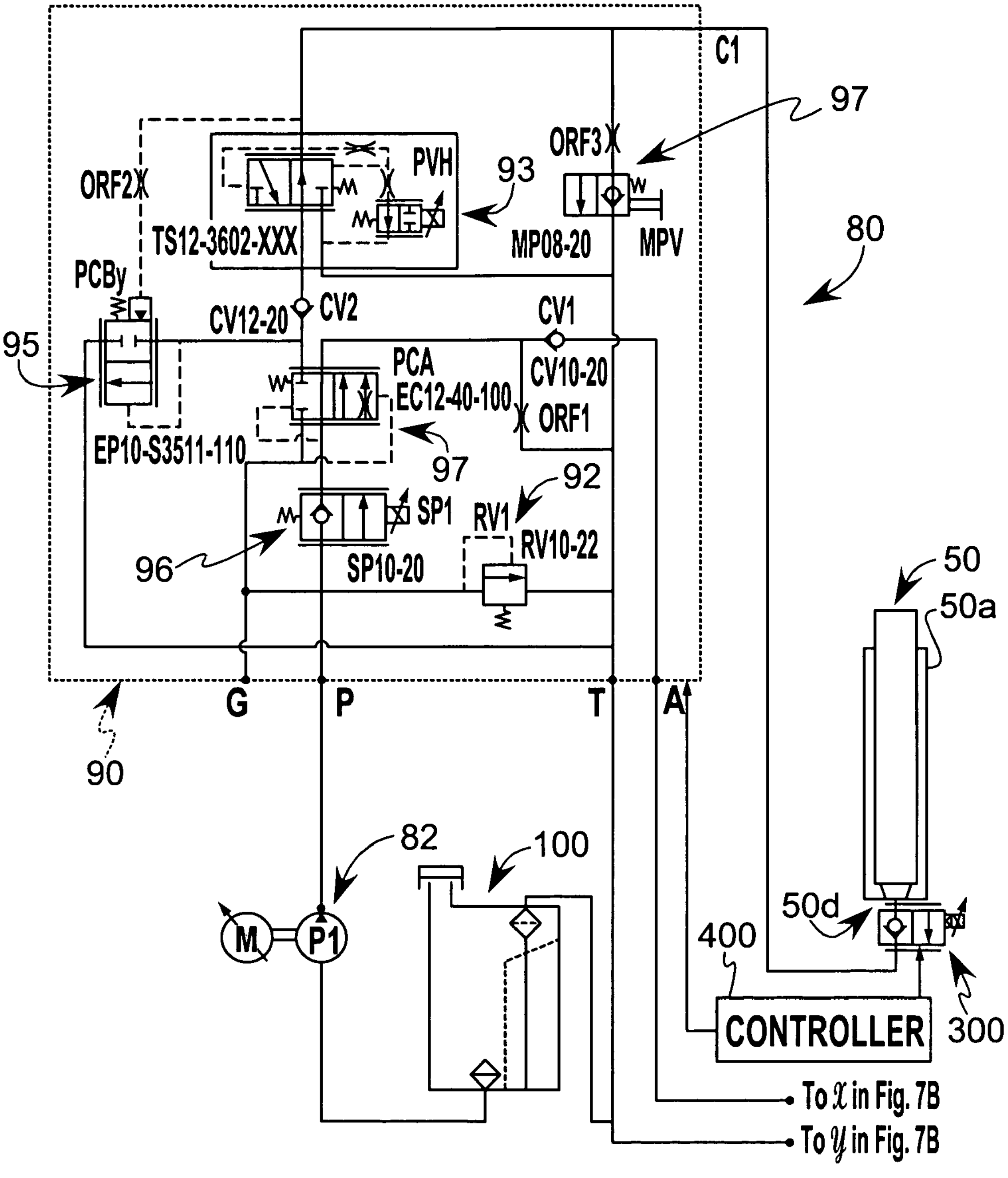
FIGS. 7A and 7B illustrate schematic fluid circuit diagrams for the vehicle of FIG. 1.
Figure 7B:
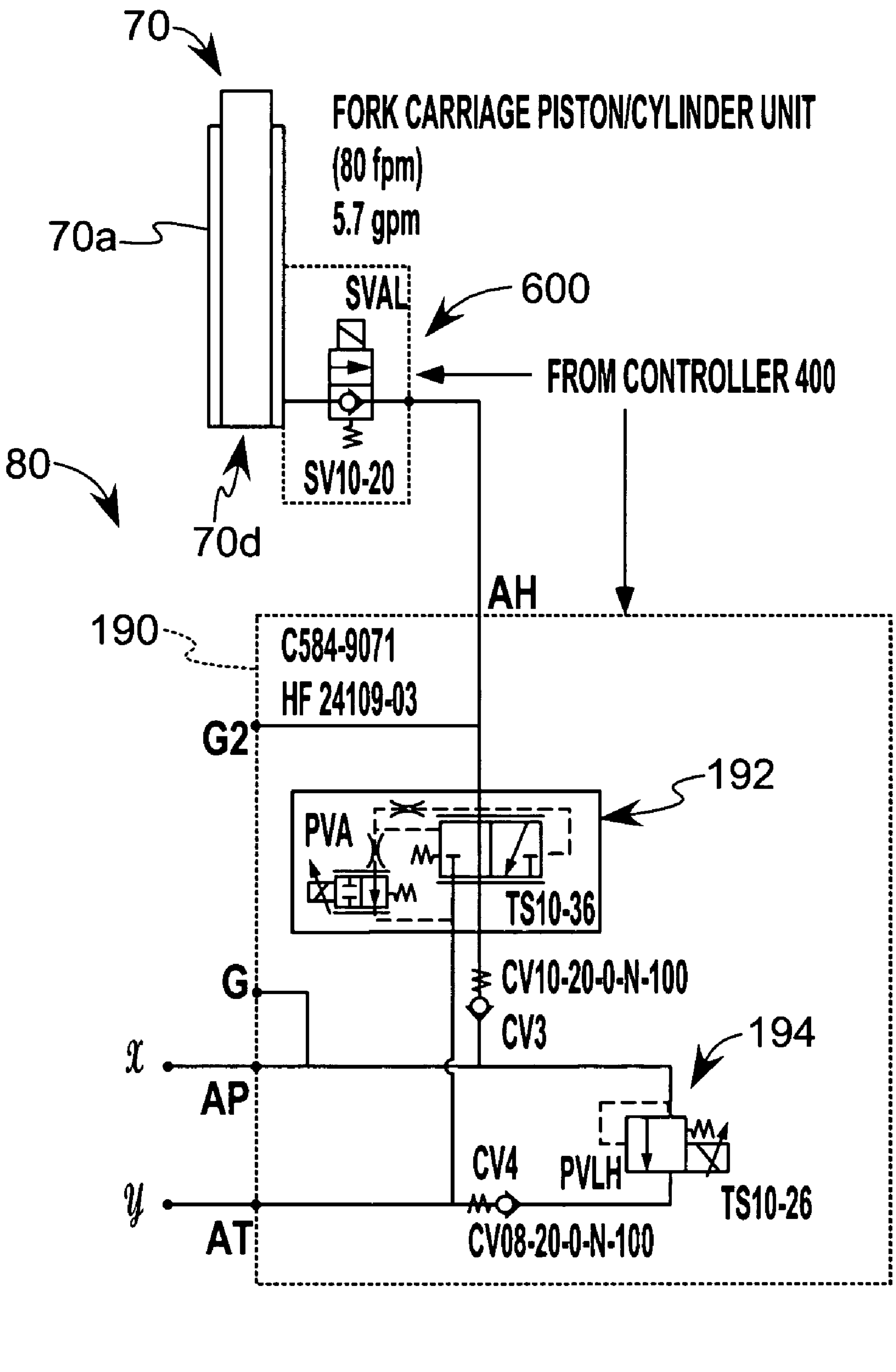

A hydraulic system 80 is illustrated in FIGS. 7A and 7B for supplying pressurized fluid to the mast piston/cylinder unit 50 and the second structure piston/cylinder unit 70. The system 80 comprises a hydraulic pump 82, a first manifold 90 and a second manifold 190. The pump 82 provides pressurized fluid to the manifolds 90 and 190. In response to operator generated commands, such as from a commanded speed input device (not shown in FIGS. 7A-7B), a controller 400 causes the first manifold 90 to provide pressurized fluid to the piston/cylinder unit 50 and causes the first and second manifolds 90 and 190 to provide pressurized fluid to the second structure piston/cylinder unit 70.

Positioned within or coupled to the base 50*d* of the cylinder 50*a* is a first electronically controlled valve 300, which valve is coupled to the first manifold 90 and the controller 400, see FIG. 7A. In the illustrated embodiment, the valve 300 comprises a solenoid-operated, two-way, normally closed, poppet-type, proportional, screw-in hydraulic cartridge valve, one of which is commercially available from HydraForce Inc., of Lincolnshire, Ill., under the product designation "SP10-20." The electronically controlled valve 300 is energized by the controller 400 only when the second mast 28*b* and, hence, the platform and load handling assemblies 30 and 40, are to be lowered relative to the first mast 28*a*. At all other times, the valve 300 is de-energized. When de-energized, the valve 300 functions as a check valve so as to block pressurized fluid from flowing out of the cylinder 50*a*. It also permits, when functioning as a check valve, pressurized fluid to flow into the cylinder 50*a*, which occurs during a platform assembly 30 lift operation. More specifically, in response to an operator generated command, the controller 400 causes the first manifold 90 to provide pressurized fluid to the piston/cylinder unit 50, the pressure of which is sufficient to raise the second mast 28*b* relative to the first mast 28*a*.

During a platform assembly 30 lowering operation, the electronically controlled valve 300 is energized such that it is opened to allow pressurized fluid in the cylinder 50*a* to return to a holding or storage reservoir 100 resulting in the second mast 28*b*, the platform assembly 30 and the load handling assembly 40 moving downwardly relative to the power unit 20. An encoder unit 401 is provided for generating encoder pulses as a function of movement of the platform assembly 30 relative to the power unit 20, see FIG. 4.

The encoder unit 401 comprises an encoder 402 which generates pulses to the controller 400 (not shown in FIG. 4) in response to extension and retraction of a wire or cable 404. The cable 404 is fixed at one end to the power unit 20 and coupled at the other end to a spring-biased spool 406. The spool 406 forms part of the encoder unit 401 and is coupled to the platform assembly 30 along with the encoder 402. The cable 404 rotates the spool 406 in response to movement of the platform assembly 30 relative to the power unit 20 such that the encoder 402 generates encoder pulses indicative of extension and retraction of the cable 404. In response to encoder pulses, the controller 400 can determine the position of the platform assembly 30 relative to the power unit 20 and also the speed of movement of the platform assembly 30 relative to the power unit 20 as is well known in the art. In accordance with one embodiment of the present invention, if the rate of unintended descent of the platform assembly 30 exceeds a commanded speed, such as when there is a loss of hydraulic pressure in the fluid metered from the cylinder 50*a*, the controller 400 generates a signal, i.e., turns off power to the valve 300, causing the valve 300 to close. As used herein, "an unintended descent in excess of a commanded speed" means that the rate of descent of the carriage assembly: 1) is greater than a commanded speed, such as where the commanded speed is 100 feet/minute and the actual or sensed speed is 101 feet/minute; or 2) is greater than the commanded speed plus a tolerance speed, such as a commanded speed of 100 feet/minute and a tolerance speed of 5 feet/minute. With regards to definition 1) and the corresponding example, the controller would generate a signal to turn off power to the valve when the actual descent speed is greater than or equal to 101 feet/minute. With regards to definition 2) and the corresponding example, the controller would generate a signal to turn off power to the valve when the actual descent speed is greater than or equal to 105 feet/minute. Again, the limitation, "an unintended descent in excess of a commanded speed" is intended to encompass both definitions set out above.

In accordance with an alternative embodiment of the present invention, if the rate of unintended descent of the platform assembly 30 exceeds a commanded speed and a predefined threshold speed, such as when there is a loss of hydraulic pressure in the fluid metered from the cylinder 50*a*, the controller 400 generates a signal, i.e., turns off power to the valve 300, causing the valve 300 to close. As used herein, "an unintended descent in excess of a commanded speed and a predefined speed" means that the rate of descent of the carriage assembly: 1) exceeds a commanded speed, as defined above, and 2) exceeds a predefined threshold speed, such as a fixed speed of 120 feet/minute. In this alternative embodiment, if the intended rate of descent is 90 feet/minute and the actual or sensed rate of descent is 125 feet/minute, the controller will generate a signal to turn off power to the valve. Further with regards to the alternative embodiment, if the intended rate of descent is 150 feet/minute and the sensed rate of descent is 130 feet/minute, the controller will not generate a signal to turn off power to the valve. Still further with regards to the alternative embodiment, if the intended rate of descent is 90 feet/minute and the sensed rate of descent is 110 feet/minute, the controller will not generate a signal to turn off power to the valve.

As noted above, the predefined threshold speed may comprise a fixed speed of 120 feet/minute. However, the predefined threshold speed may comprise a fixed speed greater than or less than 120 feet/minute. It is noted that, in response to an operator-generated command to lower the platform assembly 30, the controller 400 may energize the valve 300 so as to open the valve 300 to allow the platform assembly 30 to be lowered at a rate in excess of 120 feet/minute. For this operation, however, the descent is intended and controlled. Hence, in this embodiment, the controller 400 does not de-energize the valve 300 during a controlled descent of the platform assembly 30 at speeds in excess of 120 feet/minute, i.e., the threshold speed.

In accordance with the present invention, the valve 300 can be rapidly closed. However, because the valve 300 is a proportional valve, its closing can be controlled such that the valve 300 closes over an extended time period. In the illustrated embodiment, the closing of the valve 300 is controlled by varying the control current to the valve 300. For example, the controller 400 may cause the valve 300 to close over an extended time period, such as between about 0.3 to about 1.0 second and, preferably, from about 0.5 to about 0.7 second, so that a portion of the kinetic energy of the moving platform assembly 30, the load handling assembly 40 and any loads on the assemblies 30 and 40 is converted into heat, i.e., a pressure drop occurs across an orifice within the valve 300 resulting in heating the hydraulic fluid. Consequently, the magnitude of a pressure spike within the cylinder 50*a*, which occurs when the piston 50*b* stops its downward movement within the cylinder 50*a*, is reduced.

Closing the valve 300 over an extended time period will result in the platform assembly 30 moving only a small distance further than it would otherwise move if the valve 300 were closed immediately. For example, if the controller 400 begins to close the valve 300 when the platform assembly 30 is moving at a speed of 200 feet/minute and 0.5 second later moves the valve 300 to a near completely closed state such that the speed of the platform assembly 30 is 40 feet/minute, the platform assembly 30 will have moved only one foot during that extended time period (0.5 second). When the platform assembly 30 comes to a complete stop, it will have moved a total distance of about 1.042 feet.

In the illustrated embodiment, a control structure comprises the combination of the controller 400 and the encoder unit 401; however, other structures can be used to make up the control structure as will be apparent to those skilled in the art. For example, a differential pressure sensor (not shown) may be associated with the cylinder 50*a* to sense fluid pressure differences across an orifice, such as an orifice within the valve 300. The sensor may comprise two fluid ports positioned on opposing sides of the orifice within the valve 300. Those ports communicate with a differential pressure sensor, which senses differences in fluid pressure across the orifice within the valve 300. An increase in fluid pressure difference across the orifice may occur when an increase in fluid flow out of the cylinder 50*a* occurs. In response to such fluid pressure differences, the pressure sensor generates signals to the controller 400, which signals may be indicative of the downward speed of the carriage assembly 30. If an unexpected increase in fluid pressure difference occurs across the orifice due to an unexpected increase in fluid flow out of the cylinder 50*a*, thereby indicating an unintended descent of the platform assembly 30, the controller 400 functions to de-energize the valve 300 causing it to move from its powered open state to its closed state.

Figure 8:
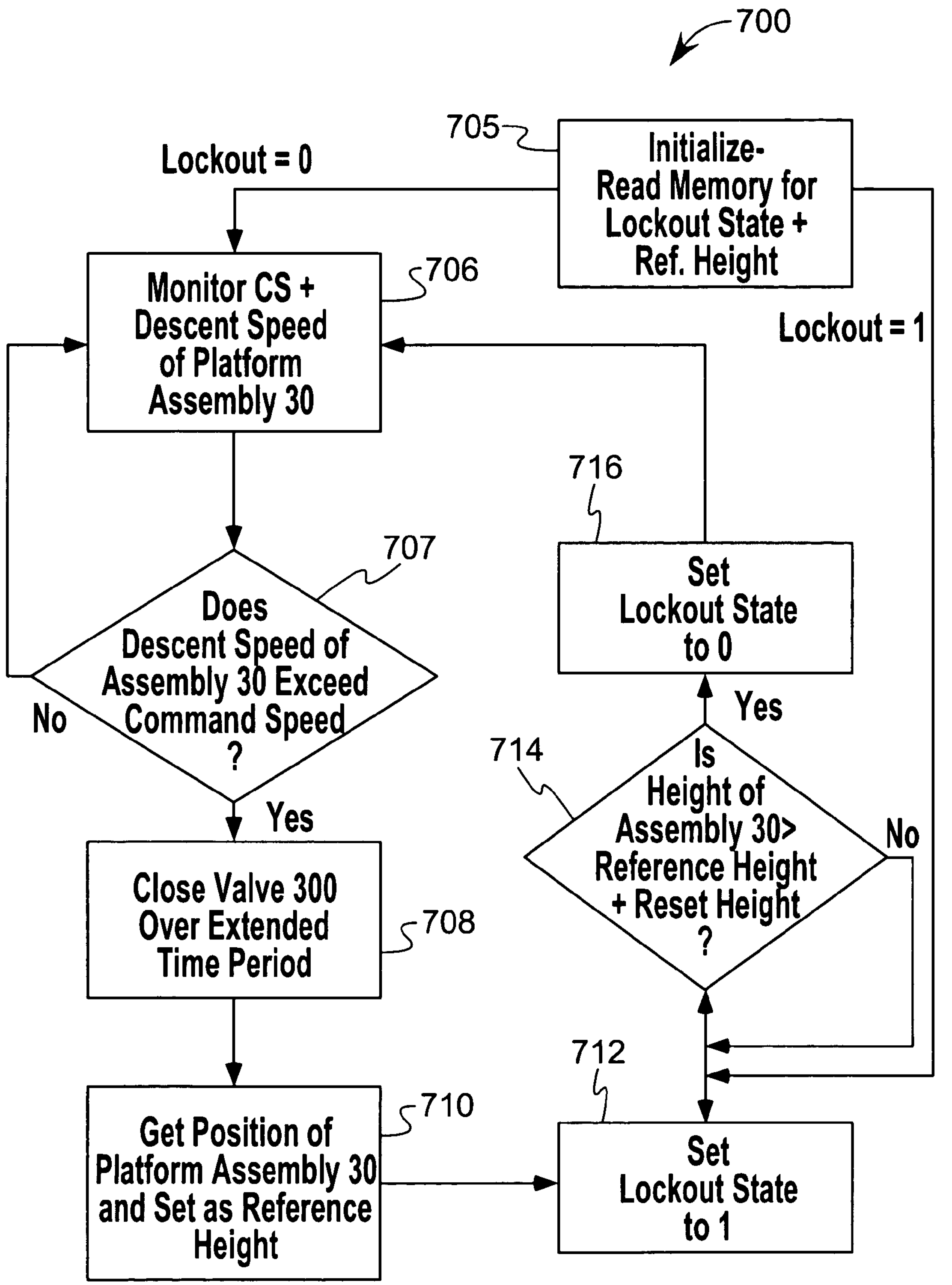
FIG. 8 is a flow chart illustrating process steps implemented by a controller in accordance with one embodiment of the present invention.

Referring to FIG. 8, a flow chart illustrates a process 700 implemented by the controller 400 for controlling the operation of the electronically controlled valve 300 in accordance with one embodiment of the present invention. At step 705, when the vehicle 10 is powered-up, the controller 400 reads non-volatile memory (not shown) associated with the controller 400 to determine the value stored within a first "lockout" memory location. If, during previous operation of the vehicle 10, the controller 400 determined, based on signals received from the encoder 402, that the platform assembly 30 traveled in an unintended descent at a speed in excess of an operator commanded speed, the controller 400 will have set the value in the first lockout memory location to 1. If not, the value in the first lockout memory location would remain set at 0.

If the controller 400 determines during step 705 that the value in the first lockout memory location is 0, the controller 400 continuously monitors an operator generated commanded speed (designated "CS" in FIG. 8), and movement of the platform assembly 30 via signals generated by the encoder 402, see steps 706 and 707. If the platform assembly 30 moves downward at an unintended speed in excess of the commanded speed, then the controller 400 closes the valve 300, see step 708. As noted above, the valve 300 may be closed over an extended time period, e.g., from about 0.5 second to about 0.7 second. Once the valve 300 has been closed and after a predefined wait period, the controller 400 determines, based on signals generated by the encoder 402, the height of the platform assembly 30 and defines that height in non-volatile memory as a first "reference height," see step 710. The controller 400 also sets the value in the first lockout memory location to "1," see step 712, as an unintended descent fault has occurred. As long as the value in the first lockout memory location is set to 1, the_controller 400 will not allow the valve 300 to be energized such that it is opened to allow descent of the platform assembly 30. However, the controller 400 will allow, in response to an operator-generated lift command, pressurized fluid to be provided to the cylinder 50*a*, which fluid passes through the valve 300.

If, after an unintended descent fault has occurred and in response to an operator-generated command to lift the platform assembly 30, the piston/cylinder unit 50 is unable to lift the platform assembly 30, then the value in the first lockout memory location remains set to 1. On the other hand, if, in response to an operator-generated command to lift the platform assembly 30, the piston/cylinder unit 50 is capable of lifting the platform assembly 30 above the first reference height plus a first reset height, as indicated by signals generated by the encoder 402, the controller 400 resets the value in the first lockout memory location to 0, see steps 714 and 716. Thereafter, the controller 400 will allow the valve 300 to be energized such that it can be opened to allow controlled descent of the platform assembly 30. Movement of the platform assembly 30 above the first reference height plus a first reset height indicates that the hydraulic system 80 is functional. The first reset height may have a value of 0.25 inch to about 4 inches.

If the controller 400 determines during step 705 that the value in the first lockout memory location is 1, the controller 400 continuously monitors the height of the platform assembly 30, via signals generated by the encoder 402, to see if the platform assembly 30 moves above the first reference height plus the first reset height, see step 714.

The structure defining the first manifold 90 may vary and that shown in FIG. 7A is provided for illustrative purposes only. An example first manifold 90 is illustrated in FIG. 7A. It comprises a mechanical safety valve 92, which returns fluid to the storage reservoir 100 if the fluid pressure near the pump 82 exceeds a defined value. An electro-proportional valve 93 is provided to control the rate at which pressurized fluid is provided to the valve 300. One such valve 93 is commercially available from HydraForce Inc. under the product designation "TS12-3602." A solenoid-operated, two-way, normally closed, poppet-type, proportional, screw-in hydraulic cartridge valve 96 is provided to define a variable opening through which fluid from the pump 82 flows. One such valve 96 is commercially available from HydraForce Inc. under the product designation "SP10-20." A priority valve 97 is provided to ensure that the pressure across the proportional valve 96 remains substantially constant. One such valve is commercially available from HydraForce Inc., of Lincolnshire, Ill., under the product designation "EC 12-40-100." Valves 96 and 97 work in conjunction with one another to ensure that adequate fluid flow is first provided to the second manifold 190 and then to the valve 93. Also provided is a mechanical unloading valve 95, which diverts any extra fluid flow not used by the mast piston/cylinder unit 50 to the reservoir 100. Mechanical valve 97 is further provided and functions as a manual platform assembly lowering valve. Valves 93 and 96 are controlled by the controller 400.

Figure 8A:
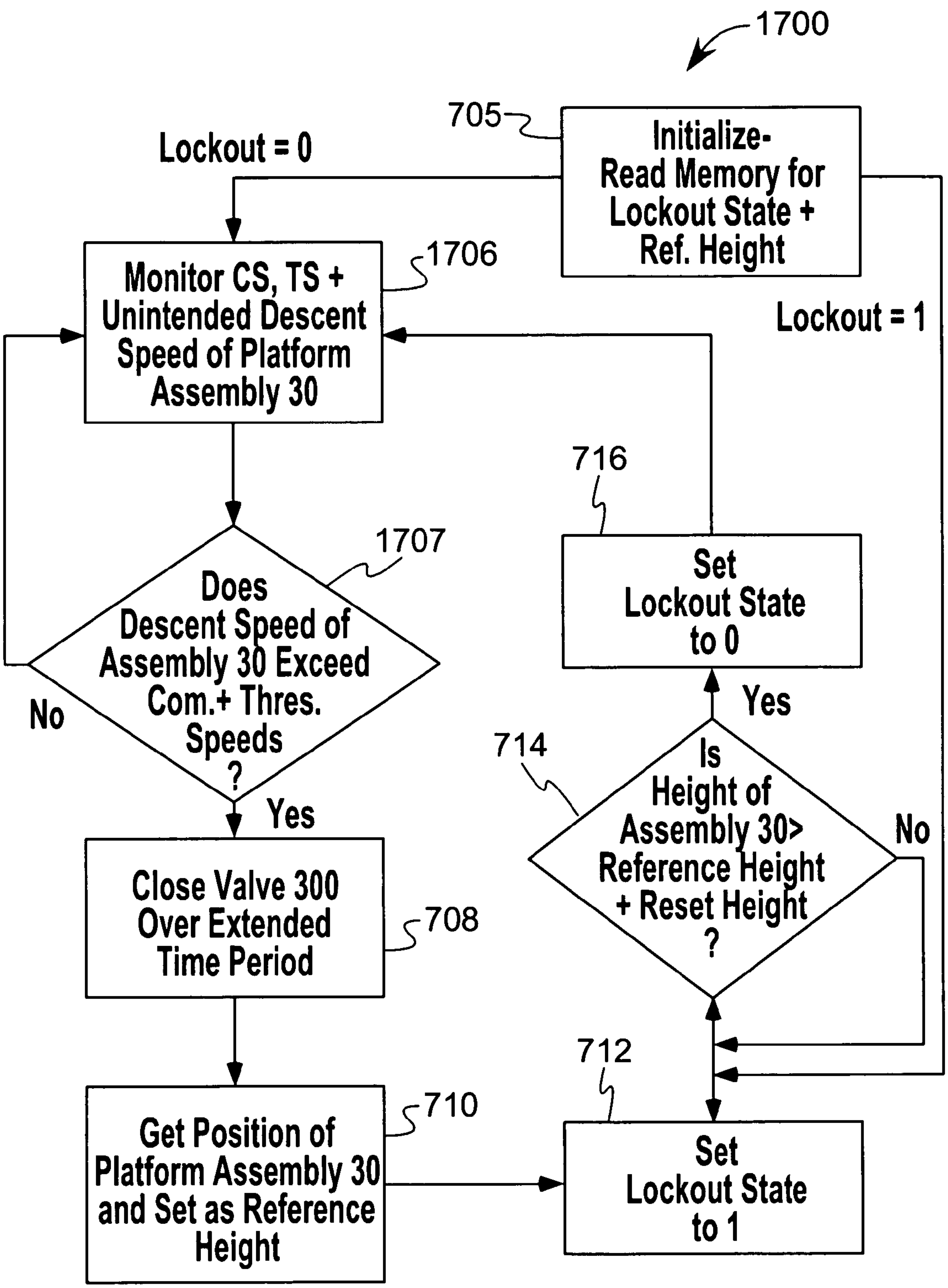
FIG. 8A is a flow chart illustrating process steps implemented by a controller in accordance with a further embodiment of the present invention.

Referring to FIG. 8A, where like steps of FIG. 8 are referenced by like reference numerals, a flow chart illustrates a process 1700 implemented by the controller 400 for controlling the operation of the electronically controlled valve 300 in accordance with the further embodiment of the present invention discussed above. In this embodiment, steps 705, 708, 710, 712, 714, and 716 are substantially identical to steps 705, 708, 710, 712, 714, and 716 described above and illustrated in FIG. 8. In this embodiment, if the controller 400 determines during step 705 that the value in the first lockout memory location is 0, the controller 400 continuously monitors an operator generated commanded speed (designated "CS" in FIG. 8A), a predefined threshold speed (designated "TS" in FIG. 8A), and movement of the platform assembly 30 via signals generated by the encoder 402, see steps 1706 and 1707. The predefined threshold speed may be defined by the manufacturer during production and may correspond to an industry standard. An example predefined threshold speed may be a fixed speed of 120 feet/minute. If the platform assembly 30 moves downwardly in an unintended manner in excess of the commanded speed and the predefined threshold speed, then the controller 400 closes the valve 300, see steps 1707 and 708. As noted above, the predefined threshold speed may be greater than or less than 120 feet/minute.

Coupled to or near the base 70*d* of the cylinder 70*a* is a second electronically controlled valve 600, see FIGS. 5 and 7B, which valve is coupled to the second manifold 190 and the controller 400. In the illustrated embodiment, the valve 600 comprises a solenoid-operated, two-way, normally closed, poppet-type, screw-in hydraulic cartridge valve, one of which is commercially available from HydraForce Inc., of Lincolnshire, Ill., under the product designation "SV10-20." The electronically controlled valve 600 is energized by the controller 400 only when the fork carriage assembly 60 is to be lowered relative to the load handling assembly 40. At all other times, the valve 600 is de-energized. When de-energized, the valve 600 defines a check valve so as to block pressurized fluid from flowing out of the cylinder 70*a*. The valve 600 also permits, when functioning as a check valve, pressurized fluid to flow into the cylinder 70*a*, which occurs during a fork carriage assembly 60 lift operation. More specifically, in response to an operator generated command, the controller 400 causes the first and second manifolds 90 and 190 to provide pressurized fluid to the piston/cylinder unit 70, the pressure of which is sufficient to lift the fork carriage assembly 60 relative to the load handling assembly 40.

During a fork carriage assembly 60 lowering operation, the electronically controlled valve 600 is energized such that it is opened to allow pressurized fluid to return to the storage reservoir 100 resulting in the fork carriage assembly 60 moving downwardly relative to the load handling assembly 40. An encoder unit 701 is provided for generating encoder pulses as a function of movement of the fork carriage assembly 60 relative to the load handling assembly 40. In response to encoder pulses, the controller 400 can determine the position of the fork carriage assembly 60 relative to the load handling assembly 40 and also the speed of the fork carriage assembly 60 relative to the load handling assembly 40.

The encoder unit 701 comprises an encoder 702 fixedly coupled to the second structure 44 of the load handling assembly 40, which generates pulses to the controller 400 in response to extension and retraction of a wire or cable 704. The cable 704 is fixed at one end to the roller 70*c* and coupled at the other end to a spring-biased spool 703. The cable 704 rotates the spool 703 in response to movement of the fork carriage assembly 60 relative to the second structure 44. In accordance with one embodiment of the present invention, if the rate of descent of the fork carriage assembly 60 exceeds an operator-commanded speed, such as when there is a loss of hydraulic pressure, the controller 400 generates a signal, i.e., turns off power to the valve 600, causing the valve 600 to close. The valve 600 in the illustrated embodiment is not a proportional valve. However, a proportional valve similar to valve 300 could be used in place of the valve 600.

In accordance with a further embodiment of the present invention, if the rate of unintended descent of the fork carriage assembly 60 exceeds a commanded speed and a predefined threshold speed, such as when there is a loss of hydraulic pressure in the fluid provided to the cylinder 70*a*, the controller 400 generates a signal, i.e., turns off power to the valve 600, causing the valve 600 to close. An example predefined threshold speed is 120 feet/minute. It is noted that, in response to an operator-generated command to lower the fork carriage assembly 60, the controller 400 may energize the valve 600 so as to open the valve 600 to allow the fork carriage assembly 60 to be lowered at a rate in excess of 120 feet/minute. For this operation, however, the descent is intended and controlled. Hence, in this embodiment, the controller 400 does not de-energize the valve 600 during a controlled descent of the fork carriage assembly 60 at speeds in excess of 120 feet/minute.

Figure 9:
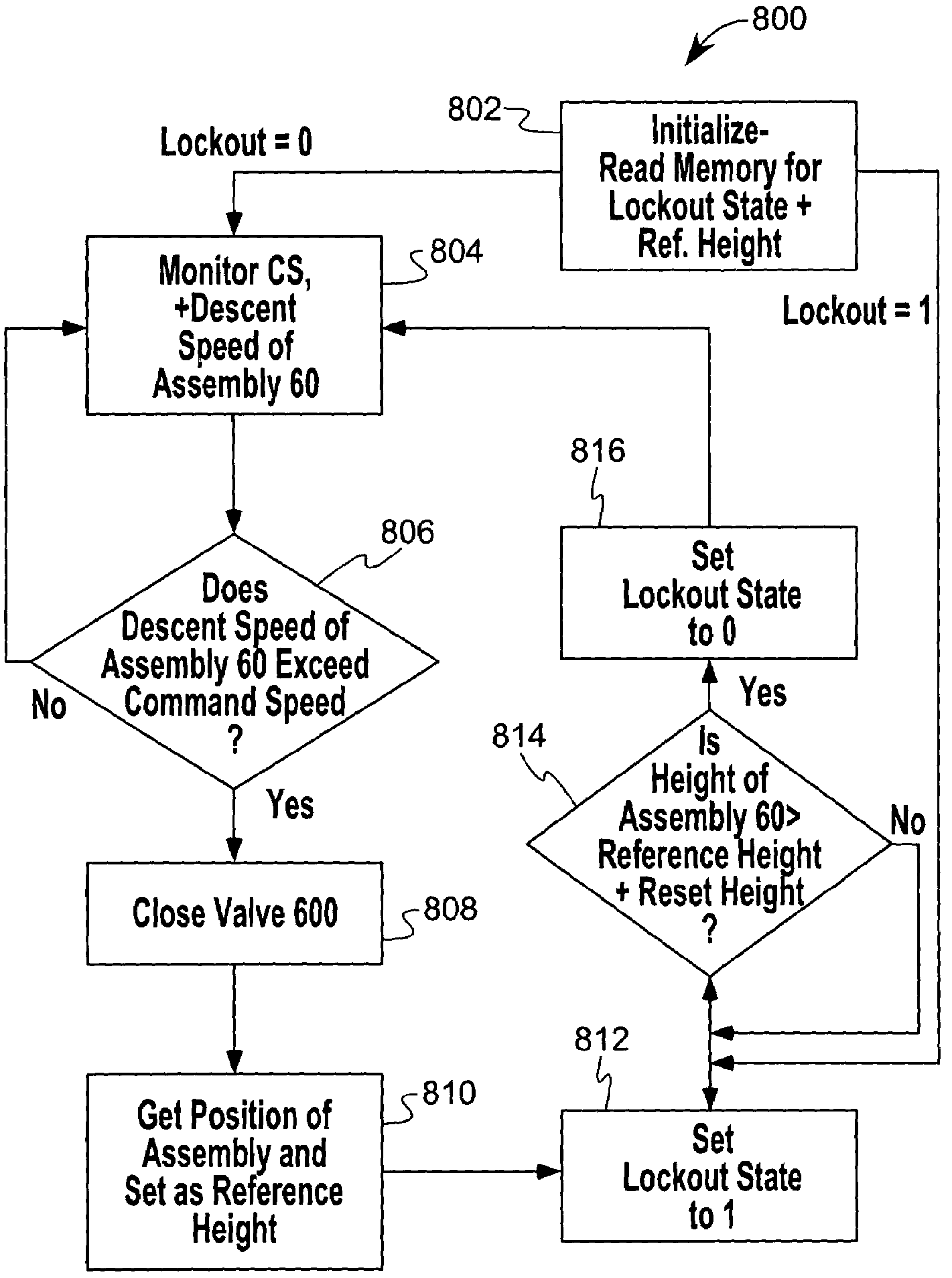
FIG. 9 is a flow chart illustrating process steps implemented by a controller in accordance with one embodiment of the present invention.

Referring to FIG. 9, a flow chart illustrates a process 800 implemented by the controller 400 for controlling the operation of the electronically controlled valve 600. At step 802, when the vehicle 10 is powered-up, the controller 400 reads data in the non-volatile memory to determine the value stored within a second "lockout" memory location. If, during previous operation of the vehicle 10, the controller 400 determined, based on signals received from the encoder 702, that the fork carriage assembly 60 traveled at a speed in excess of a commanded speed, the controller 400 will have set the value in the second lockout memory location to 1. If not, the value in the second lockout memory location would remain set at 0.

If the controller 400 determines during step 802 that the value in the second lockout memory location is 0, the controller 400 continuously monitors an operator generated commanded speed (designated "CS" in FIG. 9), and movement of the fork carriage assembly 60 via signals generated by the encoder 702, see steps 804 and 806. If the fork carriage assembly 60 moves downwardly at a speed in excess of the commanded speed, then the controller 400 closes the valve 600, see step 808. Once the valve 600 has been closed and after a predefined wait period, the controller 400 determines, based on signals generated by the encoder 702, the height of the fork carriage assembly 60 and defines that height in non-volatile memory as a second "reference height," see step 810. The controller 400 also sets the value in the second lockout memory location to "1," see step 812, as an unintended descent fault has occurred. As long as the value in the second lockout memory location is set to 1, the controller 400 will not allow the valve 600 to be energized such that it is opened to allow descent of the fork carriage assembly 60. However, the controller 400 will allow, in response to an operator-generated lift command, pressurized fluid to be provided to the cylinder 70*a*, which fluid passes through the valve 600.

If, after an unintended descent fault has occurred and in response to an operator-generated command to lift the fork carriage assembly 60, the piston/cylinder unit 70 is unable to lift the fork carriage assembly 60, then the value in the second lockout memory location remains equal to 1. On the other hand, if, in response to an operator-generated command to lift the fork carriage assembly 60, the piston/cylinder unit 70 is capable of lifting the fork carriage assembly 60 above the second reference height plus a second reset height, as indicated by signals generated by the encoder 702, the controller 400 resets the value in the lockout memory location to 0, see steps 814 and 816. Thereafter, the controller 400 will allow the valve 600 to be energized such that it can be opened to allow controlled descent of the fork carriage assembly 60. The second reset height may have a value from about 0.25 inch to about 4 inches.

If the controller 400 determines during step 802 that the value in the second lockout memory location is 1, the controller 400 continuously monitors the height of the fork carriage assembly 60, via signals generated by the encoder 702, to see if the fork carriage assembly 60 moves above the second reference height plus the second reset height, see step 814.

Figure 9A:
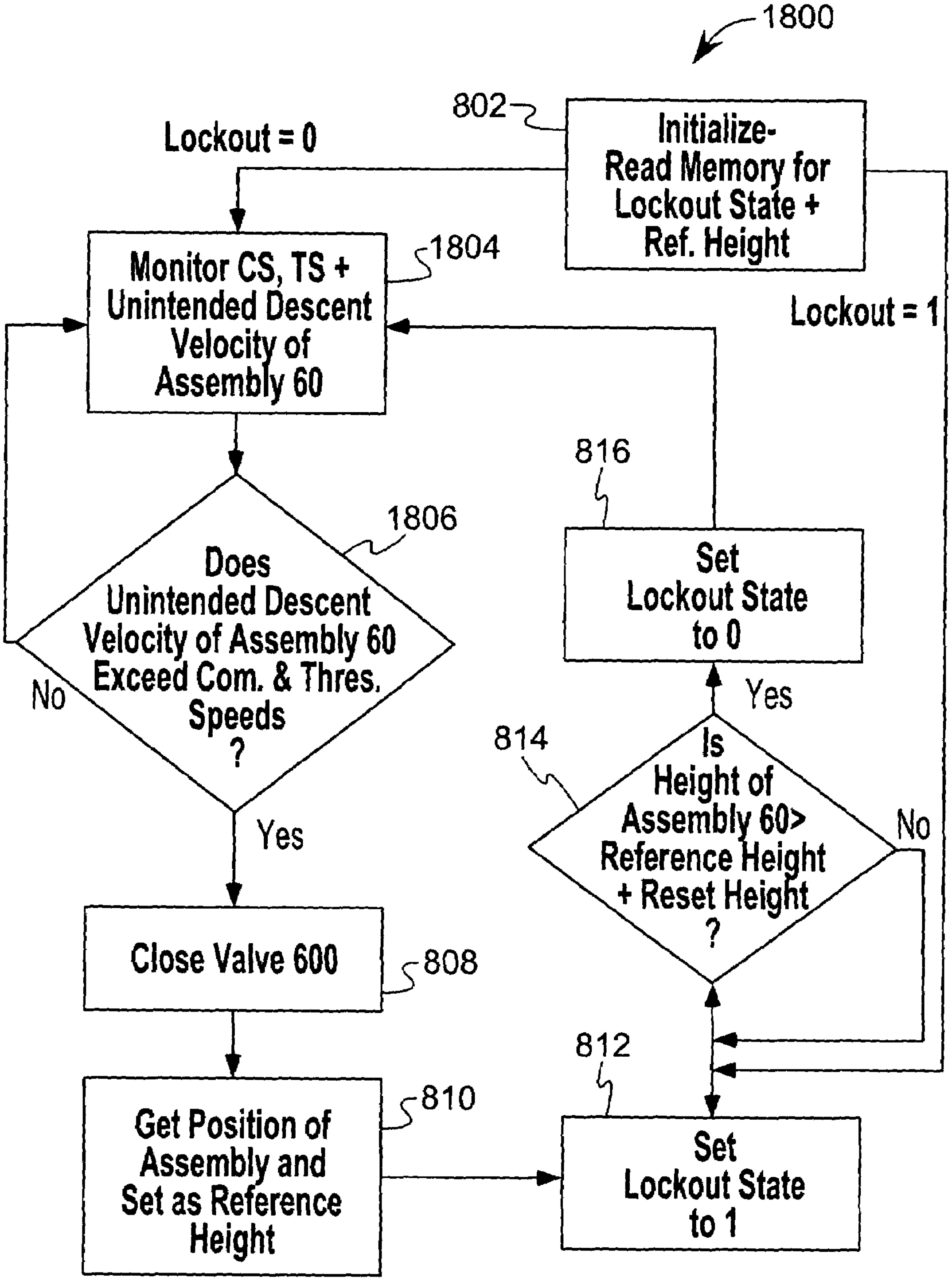
FIG. 9A is a flow chart illustrating process steps implemented by a controller in accordance with a further embodiment of the present invention.

Referring to FIG. 9A, where like steps of FIG. 9 are referenced by like reference numerals, a flow chart illustrates a process 1800 implemented by the controller 400 for controlling the operation of the electronically controlled valve 600 in accordance with the further embodiment of the present invention discussed above. In this embodiment, steps 802, 808, 810, 812, 814, and 816 are substantially identical to steps 802, 808, 810, 812, 814, and 816 described above and illustrated in FIG. 9. In this embodiment, if the controller 400 determines during step 802 that the value in the second lockout memory location is 0, the controller 400 continuously monitors an operator generated commanded speed (designated "CS" in FIG. 9A), a predefined threshold speed (designated "TS" in FIG. 9A), and movement of the fork carriage assembly 60 via signals generated by the encoder 402, see steps 1804 and 1806. The predefined threshold speed may be defined by the manufacturer during production and may correspond to an industry standard. An example predefined threshold speed may be 120 feet/minute. If the fork carriage assembly 60 moves downwardly in an unintended manner in excess of the commanded speed and the predefined threshold speed, then the controller 400 closes the valve 600, see steps 1806 and 808. As noted above, the predefined threshold speed may be greater than or less than 120 feet/minute.

The second manifold 190 comprises in the illustrated embodiment an electro-proportional valve 192, which controls the rate at which pressurized fluid is provided to the valve 600. One such valve 192 is commercially available from HydraForce Inc. under the product designation "TS10-36." Also provided is an electronically controlled pressure release valve 194. As illustrated in FIGS. 7A and 7B, the second manifold 190 is coupled to the first manifold 90. While not illustrated in FIG. 7B, the second manifold 190 further comprises appropriate structure for providing pressurized fluid to hydraulic devices for effecting transverse movement of the first structure 42, and rotational movement of the second structure 44.

It is further contemplated that the controller 400 may turn off power to the valve 300 if the rate of descent of the platform assembly 30 exceeds a predefined, fixed threshold speed, such as 120 feet/minute. It is still further contemplated that the controller 400 may turn off power to the valve 600 if the rate of unintended descent of the fork carriage assembly 60 exceeds a predefined, fixed threshold speed, such as 120 feet/minute. In both embodiments, the controller 400 will not allow either the platform assembly 30 or the fork carriage assembly 60 to move downwardly at a speed in excess of the threshold speed. The predefined, fixed threshold speed may be defined by the manufacturer during production of the truck.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A materials handling vehicle comprising:

a base;

a carriage assembly movable relative to said base;

at least one cylinder coupled to said base to effect movement of said carriage assembly relative to said base;

a hydraulic system to supply a pressurized fluid to said cylinder, said hydraulic system including an electronically controlled valve coupled to said cylinder; and control structure to control the operation of said valve such that said valve is closed in the event of an unintended descent of a carriage assembly in excess of a commanded speed.

2. A materials handling vehicle as set forth in claim 1, wherein said control structure is capable of energizing said valve so as to open said valve to permit said carriage assembly to be lowered in a controlled manner to a desired position relative to said base.

3. A materials handling vehicle as set forth in claim 2, wherein said control structure de-energizes said valve in response to an operator-generated command to cease further descent of said carriage assembly relative to said base.

4. A materials handling vehicle as set forth in claim 3, wherein said valve functions as a check valve when de-energized so as to block pressurized fluid from flowing out of said cylinder, and allowing pressurized fluid to flow into said cylinder during a carriage assembly lift operation.

5. A materials handling vehicle as set forth in claim 1, wherein said valve comprises a solenoid-operated, normally closed valve.

6. A materials handling vehicle as set forth in claim 1, wherein said valve comprises a solenoid-operated, normally closed, proportional valve.

7. A materials handling vehicle as set forth in claim 1, wherein said valve is positioned in a base of said cylinder.

8. A materials handling vehicle as set forth in claim 1, wherein said control structure comprises:

an encoder unit associated with said carriage assembly for generating encoder pulses as said carriage assembly moves relative to said base; and a controller coupled to said encoder unit and said valve for receiving said encoder pulses generated by said encoder unit and monitoring the rate of descent of said carriage assembly based on said received encoder pulses, said controller functioning to de-energize said valve causing it to move from its powered open state to its closed state in the event said carriage assembly moves downwardly at a speed in excess of said commanded speed.

9. A materials handling vehicle as set forth in claim 8, wherein said controller slowly closes said valve in the event said carriage assembly moves downwardly at a speed in excess of said commanded speed.

10. A materials handling vehicle as set forth in claim 9, wherein said controller causes said valve to move from its powered open position to its closed position over a time period of from about 0.3 second to about 1.0 second.

11. A materials handling vehicle as set forth in claim 9, wherein said controller causes said valve to move from its powered open position to its closed position over a time period of from about 0.5 second to about 0.7 second.

12. A materials handling vehicle as set forth in claim 1, wherein said base comprises a power unit and said carriage assembly comprises a platform assembly which moves relative to said power unit along a mast assembly.

13. A materials handling vehicle as set forth in claim 1, wherein said base comprises a load handler assembly and said carriage assembly comprises a fork carriage assembly which moves relative to said load handler assembly.

14. A materials handling vehicle as set forth in claim 1, wherein said control structure comprises:

a sensor for generating signals indicative of the downward speed of the carriage assembly; and a controller coupled to said sensor and said valve for receiving said signals generated by said sensor and monitoring the downward speed of said carriage assembly based on said received signals, said controller functioning to de-energize said valve causing it to move from its powered open state to its closed state in the event said carriage assembly moves in excess of said commanded speed.

15. A materials handling vehicle as set forth in claim 14, wherein said sensor comprises a differential pressure sensor.

16. A materials handling vehicle comprising:

a base;

a carriage assembly movable relative to said base;

at least one cylinder coupled to said base to effect movement of said carriage assembly relative to said base;

a hydraulic system to supply a pressurized fluid to said cylinder, said hydraulic system including an electronically controlled valve coupled to said cylinder; and control structure to control the operation of said valve such that said valve is closed in the event of an unintended descent of said carriage assembly in excess of a commanded speed and a predefined speed.

17. A materials handling vehicle as set forth in claim 16, wherein said control structure is capable of energizing said valve so as to open said valve to permit said carriage assembly to be lowered in a controlled manner to a desired position relative to said base at a speed in excess of said predefined speed.

18. A materials handling vehicle comprising:

a base;

a carriage assembly movable relative to said base;

at least one cylinder coupled to said base to effect movement of said carriage assembly relative to said base;

a hydraulic system to supply a pressurized fluid to said cylinder, said hydraulic system including an electronically controlled valve coupled to said cylinder;

control structure to control the operation of said valve such that said valve is closed in the event of a loss of pressure in the fluid being supplied by said hydraulic system to said valve, said control structure being capable of energizing said valve so as to open said valve to permit said carriage assembly to be lowered in a controlled manner to a desired position relative to said base, and said control structure acting to de-energize said valve when said carriage assembly is not being lowered in a controlled manner relative to said base; and wherein said valve functions as a check valve when de-energized so as to block pressurized fluid from flowing out of said cylinder, and allowing pressurized fluid to flow into said cylinder during a carriage assembly lift operation.

19. A materials handling vehicle comprising:

a base;

a carriage assembly movable relative to said base;

at least one cylinder coupled to said base to effect movement of said carriage assembly relative to said base;

a hydraulic system to supply a pressurized fluid to said cylinder, said hydraulic system including an electronically controlled valve coupled to said cylinder; and control structure to control the operation of said valve such that said valve is closed in the event of a loss of pressure in the fluid being supplied by said hydraulic system to said valve, said control structure comprising:

an encoder unit associated with said carriage assembly for generating encoder pulses as said carriage assembly moves relative to said base; and a controller coupled to said encoder unit and said valve for receiving said encoder pulses generated by said encoder unit and monitoring the rate of descent of said carriage assembly based on said received encoder pulses, said controller functioning to de-energize said valve causing it to move from its powered open state to its closed state in the event said carriage assembly moves downwardly in an unintended manner at a speed in excess of a commanded speed.

20. A materials handling vehicle as set forth in claim 19, wherein said controller slowly closes said valve over a period of time greater than or equal to 0.1 second in the event said carriage assembly moves downwardly in an unintended manner at a speed in excess of said commanded speed.

21. A materials handling vehicle comprising:

a base;

a carriage assembly movable relative to said base;

at least one cylinder coupled to said base to effect movement of said carriage assembly relative to said base;

a hydraulic system to supply a pressurized fluid to said cylinder, said hydraulic system including an electronically controlled valve coupled to said cylinder; and control structure to control the operation of said valve such that said valve is closed in the event of an unintended descent of a carriage assembly in excess of a fixed threshold speed.

* * * * *